United States Patent Office 2,877,499
Patented Mar. 17, 1959

2,877,499

METHOD OF PRODUCING A MOLDED ARTICLE

Robert E. Wilkinson, Lafayette, Ind., assignor to Rostone Corporation, Lafayette, Ind., a corporation of Indiana No Drawing. Application October 5, 1955
Serial No. 538,760

6 Claims. (Cl. 18—47.5)

This invention relates to the production of a molded article formed from an inorganic composition and possessing high electrical resistance, resistance to erosion by electric arcs, pronounced tendencies to suppress arcing, and the capability of being molded to accurate dimensions with relatively high strength. Articles of this general type are disclosed in prior application, Serial No. 351,650, now Patent No. 2,768,264, filed April 28, 1953, by Paul W. Jones and me. Compositions heretofore used in the production of articles of this type have commonly embodied mineral binders such, for example, as Portland cement or mixtures of lime with shales and clays. Usually, the complete molded material has also embodied fillers, such as asbestos, to improve structural strength.

In accordance with the present invention, a molding composition comprising a mixture of water with magnesium oxide or magnesium hydroxide, water, and usually a filler is prepared and molded into the desired form. The molded article is then exposed to an atmosphere of carbon dioxide to carbonate the magnesium compound; and, following such carbonation, the article is then subjected to steam under pressure to hydrate the magnesium carbonate.

A suitable mixture of dry ingredients for use in practicing my invention might consist of equal parts by weight of magnesium oxide, asbestos fiber, and a non-fibrous mineral filler. After the dry ingredients have been mixed together, the mixture is moistened by the addition of water in quantity sufficient to provide a consistency suitable for molding. Usually, the amount of water employed will be from 25% to 35% of the weight of the dry ingredients. The composition thus formed is then molded into shape under pressure.

Following molding, the articles are placed in a closed chamber and subjected to treatment with carbon dioxide gas for an extended period. The duration of such exposure will depend to a substantial extent upon the thickness of the section of the molded articles, thicker sections requiring longer periods of exposure. For articles having a section-thickness on the order of one-half inch, exposure for a period of four hours at room temperature and atmospheric pressure is usually adequate; but materially thicker sections may require an exposure of twenty-four hours. The duration of the exposure can be reduced by increasing the pressure and temperature of the carbon dioxide gas used in the treatment.

Following the treatment with carbon dioxide gas, the articles are heated in the presence of moisture, conveniently by subjecting them to steam under pressure, to hydrate the magnesium carbonate formed by the previous exposure to the carbon dioxide. The ultimate binder comprises hydrated carbonates the most common of which are $3MgCO_3 \cdot Mg(OH)_2 \cdot 4H_2O$ and $3MgCO_3 \cdot Mg(OH)_2 \cdot 3H_2O$ If the articles have dried out during or subsequent to the carbonating step and prior to hydrating, they are desirably dipped in water before being exposed to the steam.

In the specific example of molding composition set forth above, as well as in other mixtures within the scope of my invention, the magnesium oxide may be replaced with an equal proportion of magnesium hydroxide. Greatest strength in the molded articles has been obtained by employing fairly hard-burned magnesium oxide ground to pass a 200-mesh screen. However, very good results have been obtained with magnesium compounds of both coarser and finer grinds. Ordinarily, I would not employ a compound coarser than that passing a 40-mesh screen or finer than that passing a 325-mesh screen. When using a magnesium oxide it is preferable, although not always necessary, to employ one which will not hydrate readily when moistened, as otherwise heating occurs and the molding composition tends to dry out. However, if the composition is molded promptly after moistening, reactivity of the magnesium oxide is relatively unimportant.

As indicated above, magnesium hydroxide can be used instead of magnesium oxide, but that substitution tends to cause a reduction in the strength of the finished article. In some instances, particularly when employing hard-burned magnesium oxide as an ingredient in a composition to be used in the molding of relatively thick sections, it is desirable to slake or partially slake the magnesium oxide before incorporating it in the molding composition. Such treatment reduces the time required to effect complete carbonation of the magnesium compound in the molded article; and if such carbonation is not complete, the article is liable to disrupt during steaming. Slaking of magnesium oxide, when employed, can be carried out in any appropriate manner, such as by forming the oxide into a paste with water and allowing it to stand or by subjecting the dry or dampened oxide to steam.

For certain limited uses where structural strength in the molded article is of little importance, fillers may be dispensed with. However, it has been found that during processing of an article molded from a mixture containing only magnesium oxide (or magnesium hydroxide) and water, strain lines develop within the article during its processing, perhaps due to colloidal swelling and contraction, and the article is therefore rendered relatively frangible.

As appropriate non-fibrous fillers, clays, shales, zircon, silica, titanium oxide, and other inorganic materials of similar type may be employed. Where it is desired that the finished article possesses high arc-suppressing properties and the ability to withstand deterioration from arcing, the filler may consist of or include aluminum oxide or aluminum hydroxide as suggested in the prior application above referred to. A highly satisfactory composition is one in which the solid component of the molding composition consists of 35% magnesium oxide (or hydroxide), 30% asbestos, and 35% aluminum oxide or aluminum hydroxide.

Where the completed article is to possess substantial inherent strength the magnesium oxide or hydroxide employed should not exceed about 60%, by weight, of the dry ingredients, and may be as little as 7%. The proportions of ingredients necessary to produce optimum strength in the finished article depends, to an extent, on the filler or fillers employed. The compositions are moldable to accurate dimensions, and the finished articles are electrical resistive in character, have substantial arc-suppressing properties, and resist deterioration by any arcs which do occur.

Formed in appropriate shape, the finished articles are therefore admirably suited for use as arc shields or hoods of the general type set forth in the above mentioned application and in United States Letters Patent 2,240,007, granted April 29, 1941, to L. E. Power.

I claim as my invention:

1. A process of producing a molded article, comprising pressure-molding into the desired shape a mixture comprising water and a substance selected from the class consisting of magnesium oxide and magnesium hydroxide, exposing the molded article to carbon dioxide gas to convert the magnesium compound into a carbonate, and then hydrating such carbonate by treating the article with steam under pressure.

2. A process as set forth in claim 1 with the addition that the magnesium compound is a hard-burned magnesium oxide ground to pass a 200-mesh screen.

3. A process as set forth in claim 1 with the addition that the magnesium compound is a hard-burned magnesium oxide.

4. A process as set forth in claim 1 with the addition that said mixture includes a mineral filler.

5. A process as set forth in claim 1 with the addition that said mixture includes asbestos.

6. A process as set forth in claim 1 with the addition that said mixture includes a substance selected from the class consisting of aluminum oxide and aluminum hydroxide.

References Cited in the file of this patent

UNITED STATES PATENTS

| | | |
|---|---|---|
| 128,980 | Rowland | July 16, 1872 |
| 149,682 | Rowland | Apr. 14, 1874 |
| 228,548 | McDonald | June 8, 1880 |
| 236,235 | McDonald | Jan. 4, 1881 |
| 682,140 | Friswell | Sept. 3, 1901 |
| 686,672 | Friswell | Nov. 12, 1901 |
| 730,778 | Kunick | June 9, 1903 |
| 732,674 | Bell et al. | June 30, 1903 |
| 1,003,813 | Schumacher | Sept. 19, 1911 |
| 1,932,971 | Hutterman et al. | Oct. 31, 1933 |
| 2,348,614 | Dinkfield | May 9, 1944 |

FOREIGN PATENTS

| | | |
|---|---|---|
| 144,889 | Australia | Jan. 31, 1952 |
| 3,708 | Great Britain | Dec. 31, 1867 |
| 1,218 | Great Britain | Apr. 23, 1872 |